US011039318B2

(12) United States Patent
Guerin et al.

(10) Patent No.: US 11,039,318 B2
(45) Date of Patent: Jun. 15, 2021

(54) MULTI-CONFIGURATION SECURE ELEMENT AND ASSOCIATED METHOD

(71) Applicant: IDEMIA France, Courbevoie (FR)

(72) Inventors: Vincent Guerin, Izon (FR); Matthieu Boisde, Leognan (FR)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 16/668,261

(22) Filed: Oct. 30, 2019

(65) Prior Publication Data

US 2020/0137565 A1    Apr. 30, 2020

(30) Foreign Application Priority Data

Oct. 30, 2018    (FR) ...................................... 1860058

(51) Int. Cl.
*H04B 5/00* (2006.01)
*H04W 12/30* (2021.01)
*G06F 9/445* (2018.01)
*G06F 21/44* (2013.01)
*G06Q 20/32* (2012.01)
*H04W 12/08* (2021.01)

(52) U.S. Cl.
CPC ............ *H04W 12/35* (2021.01); *G06F 9/445* (2013.01); *G06F 21/44* (2013.01); *G06Q 20/3227* (2013.01); *H04W 12/08* (2013.01)

(58) Field of Classification Search
CPC ....... G06Q 20/3227; G06F 21/34; G06F 9/44; G06F 11/3051; G06F 21/78; H04W 12/08; H04W 12/35; H04W 12/086
See application file for complete search history.

(56) References Cited

U.S. PATENT DOCUMENTS

2011/0277027 A1*  11/2011  Hayton ............... H04L 63/0815
                                                           726/8
2012/0254090 A1*  10/2012  Burris .................... G06N 5/027
                                                           706/47

FOREIGN PATENT DOCUMENTS

EP    2731381 A2    5/2014
FR    2945143 A1    11/2010

OTHER PUBLICATIONS

French Search Report, dated May 28, 2019, from corresponding French application No. 1860058.

* cited by examiner

*Primary Examiner* — Nhan T Le
(74) *Attorney, Agent, or Firm* — Nixon & Vanderhye (57) ABSTRACT

Disclosed is a secure element used in a host terminal, including several communication interfaces for communication with the outside, several applications and a runtime environment. At least two applications are issuer security domains instantiating two GlobalPlatform configurations, typically GP configurations UICC and eSE. The runtime environment is configured to receive a command over a communication interface, to determine a target application for executing that command according to that communication interface and to send, over that same interface, a response to the command. This ensures the independence of the two configurations by providing that the runtime environment only authorizes access to an application resource of the secure element for executing the command by the target application if that application resource is associated with the communication interface for receiving the command.

20 Claims, 3 Drawing Sheets

MULTI-CONFIGURATION SECURE ELEMENT AND ASSOCIATED METHOD

FIELD OF THE INVENTION

The present invention concerns a secure element, for example used in a user's host terminal.

CONTEXT OF THE INVENTION

A secure element, SE, is an unbreachable hardware platform or component (typically a chip or a smartcard) used in a host terminal (typically a mobile terminal) and able to provide secure hosting for applications and data in conformity with security rules and requirements set by trusted authorities.

It is conventionally used as a slave element for resident applications on the host device or on an external device (typically a reader), that is to say a slave in a master-slave relationship with an application equipping the host terminal or the external device.

An increasingly used form factor for the SE is the eSE (standing for "embedded Secure Element"). This embedded secure element is generally soldered to the host terminal.

Secure elements are programmed according to the desired applications.

By way of example, an eSE may form the secure element required for numerous uses or services relying on NFC (Near Field Communication) implemented by a mobile host terminal. For example, an NFC payment service requires secret bank information of the user which are advantageously stored on the eSE, sheltered from any inadvertent access. This is also the case for a public transport service in which the eSE enables the user to be identified at gates.

Another secure element example is embedded UICC (standing for "Universal Integrated Circuit Card") which obtains the references for a subscriber to identify itself on a mobile telephone network. This is for example an eSE configured like a SIM card (SIM standing for "Subscriber Identity Module"). This is then referred to as an eUICC (standing for embedded Universal Integrated Circuit Card).

To facilitate the implementation of these multiple applications, it has been sought to facilitate the cooperation between the manufacturers of secure elements and the suppliers of services. To that end, the GlobalPlatform standard has been set up. The current version of this standard is version 2.3.

Under this standard, several SE configurations have been defined, for example a UICC configuration (GlobalPlatform UICC Configuration v2.0) describing the behavior of the SE for a mobile telephone application, an eSE configuration (GlobalPlatform Card Secure Element Configuration v1.0) describing the behavior of the SE for contactless applications in general, and an identity card configuration (GlobalPlatform Card ID Configuration v1.0) describing the behavior of the SE for identification applications.

All these configurations define how the SE is to react to the commands it receives from the host terminal's master application or master applications. They each implement a unique issuer security domain (or main or root security domain), known by the initialism ISD.

The ISD is a security management application accessible only by the issuer of the SE, thanks to a secret (generally a set of cryptographic keys) known only to itself.

It may be personalized through content management operations which modify its content.

For example, it may instantiate, within itself, other security domains, referred to as supplementary, accessible by service suppliers by virtue of secrets (generally cryptographic keys) specific to each domain and known only by the supplier associated with a domain.

It may also install files and applications in those different security domains.

In known manner, an eSE configured for NFC applications and soldered to a host terminal comprises an ISD representing the manufacturer of the host terminal, who authorizes, by instantiation of supplementary security domains, the installation of contactless payment applications, and contactless transport applications, provided by different suppliers.

Moreover, an SE configured as a UICC or eUICC held by a mobile telephone operator may, via the instantiation of supplementary security domains in its ISD, enable the loading of different mobile telephone profiles to access its mobile network or networks, for example with different tariffs.

It is conventional for these different configurations (NFC and UICC) to be used by a same operator. It would thus be preferable to have them on a single host terminal (the host's mobile telephone for example).

SUMMARY OF THE INVENTION

To provide two (or more) SEs within the host terminal is however not an economically acceptable solution. It is therefore sought to enable the cohabitation of these different configurations within a same SE.

Similarly, to provide a mixed configuration capable of supporting NFC applications and mobile telephone applications would not seem acceptable. For one thing, as these two "worlds" are implemented by different owners of secure elements, it would be necessary to communicate to them the same secret to be able to access the ISD of the SE. This approach is not acceptable for obvious security reasons. For another thing, complex (in fact mixed) management of behavior of the mixed configuration would have to be set up in order for the SE to adopt the "UICC" or "eSE" behavior according to the case. Complex developments are detrimental to the simplicity of SEs desired by GlobalPlatform.

The inventors have thus envisioned enabling the loading of two (or more) configurations, via two (or more) ISDs, within the same SE. There is however a need to ensure the independence of the configurations, while enabling them to use common (shared) resources, where provided.

In this context, the invention is concerned with a secure element comprising a plurality of applications and a runtime environment for executing the applications, the runtime environment being configured to receive a command on a communication interface for communication with the outside of the secure element, to determine a target application for executing the command and for sending, over the communication interface, a response to the command received from the target application.

According to the invention, the secure element is characterized in that it comprises a plurality of communication interfaces and in that the runtime environment is configured to determine the target application according to the communication interface for receiving the command and to authorize the access to an application resource of the secure element (that is to say a resource that can be used in the runtime environment, typically an application, an application programming interface or API or for instance an ELF elementary file or package) for the execution of the command by the target application solely if that application resource is associated with the communication interface for receiving the command.

In a complementary manner, the invention also concerns a processing method in a secure element comprising a plurality of communication interfaces, a plurality of applications and a runtime environment for executing the applications, the method comprising the following steps:

receiving a command on a communication interface for communication with the outside of the secure element, determining a target application for executing the command according to the communication interface for receiving the command, authorizing the access to an application resource of the secure element for executing the command by the target application solely if that application resource is associated with the communication interface for receiving the command, and sending, over the communication interface, a response to the command received from the target application.

Thus, as many independent "worlds" may be implemented as there are communication interfaces. As a matter of fact, the runtime environment according to the invention, for example on a Java Card (tradename) virtual machine as described below, enables the segregation of the available application resources according to the communication interfaces and thus the partitioning of the "worlds".

It is thus possible to implement two or more independent ISDs, and thus two or more independent SE configurations, using distinct communication interfaces.

An SE so obtained may make several owners cohabit without them having to share a secret, for example an MNO operator and a manufacturer of the host terminal who manage, respectively, eUICC aspects and eSE aspects independently.

Optional features of embodiments of the invention are defined in the dependent claims.

In one embodiment, the secure element comprises at least two security management applications defining two issuer security domains, each issuer security domain being associated with a different communication interface. More particularly, the "configurations" as defined by GlobalPlatform are implemented by the instantiation of a first or main application referred to as ISD. Thus, this provision enables the implementation of several configurations via several corresponding ISDs.

According to a particular feature, a first issuer security domain is associated with a communication interface with contact, for example of ISO/IEC 7816 type, and a second issuer security domain is associated with a contactless communication interface, for example of ISO/IEC 14443 type. This makes it possible to distinguish easily between two main configurations of the GlobalPlatform standard.

According to another particular feature, the runtime environment is configured to manage a life cycle state register for each of the two issuer security domains. These life cycle states according to GlobalPlatform include the states OP_READY, INITIALIZED, SECURED, CM_LOCKED and TERMINATED. This provision makes it possible to manage the unique physical secure element as a plurality of apparent secure elements, each governed by the ISD of a loaded configuration.

According to still another particular feature, a security domain and the associated application resources are in accordance with one of the configurations defined by GlobalPlatform (for example eSE configuration, UICC configuration, an identity card configuration, etc.). For example, an issuer security domain and associated application resources are in accordance with the eSE configuration of the GlobalPlatform standard. Similarly (as a variant or in combination), an issuer security domain and associated application resources are in accordance with the UICC configuration of the GlobalPlatform standard. The secure element so obtained is in accordance with the GlobalPlatform standard.

In another embodiment, the runtime environment comprises a register which associates, with each of a plurality of application resources, an application identifier (AID) specific to the application resource and an indicator representing an associated communication interface (and thus an associated ISD or "world"). The two items of information may thus constitute a unique identifier for each application resource, in accordance with the requirements of the GlobalPlatform standard.

According to a particular feature, the register comprises at least one application resource associated with an indicator common to several communication interfaces. Such a resource is thus shared between different "worlds". It may for example be elementary load files (ELFs) common to several configurations, each of them able to instantiate for example an application based on ELFs in common. This provision enables memory consumption to be reduced.

For example, the ELFs in common, or any other application resource in common, may be stored in a dedicated security domain (or a further possibility is in an ISD domain already present) and be visible in/to all the instantiated domains on the secure element. "visible" here means an accessibility to the ELFs (or equivalent) enabling for example an instantiation of an application (based on those ELFs in common) in a considered domain, in particular other than that in which the ELFs in common are stored (attached).

In another embodiment, the runtime environment comprises a global variable set to a value representing the communication interface for receiving the command. This provision facilitates the management of confining the execution of a command within a "world" defined by an ISD or a given configuration. As a matter of fact, the value of this variable may be compared directly to an indicator marking each resource, to know whether the latter is accessible during the current execution.

In another embodiment, the runtime environment comprises a runtime environment in accordance with the GlobalPlatform 2.3 standard and an operating system interfacing the runtime environment in accordance with GlobalPlatform 2.3 with a hardware platform of the secure element. This architecture is advantageously in accordance with conventional practices.

In a particular embodiment, the operating system is configured to send, to the runtime environment in accordance with the GlobalPlatform 2.3 standard, any command received on a communication interface, accompanied by an indication of the receiving communication interface. This indication enables the runtime environment to update the global variable referred to above.

According to a particular feature, the operating system (OS) comprises a local variable set to a value representing the communication interface for receiving the command. This local variable enables the OS to keep a trace of the interface to use to send the response to the command.

In another particular embodiment, the runtime environment in accordance with the GlobalPlatform 2.3 standard comprises a Java Card (tradename) runtime environment formed by a Java Card virtual machine and Java Card application programming interfaces, said Java Card virtual machine being configured to check that any application resource (executable module, application, API) used for executing the command by the target application is associated with the communication interface for receiving the command. Such a check may advantageously be implemented in a firewall module of the virtual machine. The conventional functionalities of the Java firewall module become extended, by the present invention, with this new checking role.

According to a particular feature, the Java Card virtual machine is configured, on receiving a command accompanied by an indication of a receiving communication interface, to set a global variable to a value representing the indicated receiving communication interface.

According to another particular feature, a Java Card application programming interface (API), is natively (i.e. as of its compilation) associated with one (or several) specific communication interface(s), such that this Java Card API is only used for executing a command by a target application associated with the specific communication interface (or one of the interfaces natively associated with the API). This provision enables the security of the secure element to be improved.

In another particular embodiment, the runtime environment in accordance with the GlobalPlatform 2.3 standard comprises a system programming interface named OPEN in GlobalPlatform 2.3 that is configured to determine the target application according to the communication interface for receiving the command. For example, the OPEN may, by knowing the communication interface, determine a logical channel from among several logical channels sharing the same number, but established in different domains (or configurations). By domain (or configuration) is meant a group or environment dedicated to a considered interface managed by an ISD dedicated to that group or environment.

According to a particular feature, the OPEN is configured for:

accessing a register which associates, with each of a plurality of application resources, an application identifier (AID) specific to the application resource and an indicator representing an associated communication interface, and on receiving a command for selecting an application identified by an AID identifier included in the command received over a communication interface, selecting the application which, in the register, is associated with the AID identifier and with the receiving communication interface.

This selection generally takes into account the allocation of the applications (via their AID) to the different logical channels when these are selected by a SELECT command.

In still another embodiment, the runtime environment is configured for, on reception, over a second communication interface, of a second command of greater priority than the command in course of execution by the target application:

suspending the execution of the command by the target application and storing an indication representing the communication interface for receiving the suspended command, then determining a second target application for executing the second command according to the second communication interface and checking that any application resource accessed on execution of the second command by the second target application is associated with the second communication interface.

The execution of the suspended command may resume at the end of the execution of the second command of greater priority. This is made possible by the storing or saving of the information from the communication interface, since that information is used to enable the checking relating to the access to the application resources.

BRIEF DESCRIPTION OF THE DRAWINGS

Still other particularities and advantages of the invention will appear in the following description, illustrated by the appended drawings which illustrate example embodiments that are in no way limiting in character. In the drawings.

DETAILED DESCRIPTION OF THE INVENTION

The present invention is concerned with the convergence of configurations, of GlobalPlatform configuration type, within a same secure element, SE, typically an SE that is embedded (by hard-wiring or equivalent) in a host terminal.

A configuration according to GlobalPlatform for example is an implementation of the GlobalPlatform 2.3 standard which details the behavior of the SE, and more particularly of the main application for security management, also called ISD or issuer security domain in GlobalPlatform, in response to various management commands or demands issued by the host terminal.

A configuration is loaded into the SE, in the form of a compiled package defining the ISD, at the time of the pre-personalization of the SE. Thus, the configuration does not change during the life cycle of the SE. Only personalization of the SE may be carried out by content management operations (for example loading, deletion of data such as applications or profiles) within the ISD.

An example of an SE configuration is the UICC configuration (described in the document GlobalPlatform UICC Configuration v2.0) which, within the ISD, provides a neutral environment facilitating the OTA (standing for "over the air") remote management of the UICC to supply mobile services to subscribers. The communication between the host terminal and the UICC is generally carried out via an ISO communication interface with contact, typically according to the ISO/IEC 7816 protocol.

Another example of SE configuration is the eSE configuration (described in the document GlobalPlatform Card Secure Element Configuration v1.0) which, in the manner of the SE configuration, provides, within the ISD, a neutral environment for the implementation of services apart from mobile telephone services. These may be contactless payment applications, banking applications, applications for transport or equivalent (passage through an access gate), etc. In this case, the communication between the eSE and an external reader (generally outside the host equipment) may be carried out via a contactless communication interface (via a contactless module of the host terminal, for example the CLF) typically according to the ISO/IEC 14443 protocol.

Of course, other configurations defining the behavior of an ISD may be envisioned in the context of the present invention, whether or not they are defined in by the Global-Platform standard.

Each configuration, via its ISD and the behavior which that has in response to demands (commands), thus defines a particular "world" of the secure element. Below, unless stated otherwise, the terms "world", "configuration" and "ISD" are used as synonyms.

Reference will be made in particular to a UICC "world" to designate for example the GP UICC configuration and thus the ISD implemented by such a configuration. Similarly, reference will be made to a eSE "world" to designate for example the GP eSE configuration and thus the ISD implemented by such a configuration.

An objective of the present invention is to enable the functional cohabitation of two or more configurations within a same SE. This cohabitation requires independence to be ensured that is a strong as possible between the configurations, that is to say between the corresponding ISDs.

The invention provides for this objective to be attained by appropriately configuring the runtime environment in which the applications and thus the ISDs execute. The runtime environment is in particular configured to associate different communication interfaces of the SE with respective different configurations (or ISDs). It is also configured such that a command received from the outside through one of the communication interfaces is executed by an application with the configuration associated with the interface on which the command is received, and such that this execution by the application cannot employ an application resource, such as another application or an API, that is not associated with the communication interface considered.

In this context, there is a direct link between, on one side, "world", configuration, ISD and, on the other side, communication interface.

In the following examples, the example is mainly taken of two configurations or "worlds", i.e. the GP UICC and the GP eSE configuration, which are respectively associated with interfaces that are with contact and contactless. Still in these examples, in the interest of simplification of illustration, each of these "worlds" or configurations or communication interface is identified via an identifier IND, having the value for example "00" for the UICC "world"/configuration (and thus the interface with contact) and "01" for the eSE "world"/configuration (and thus the contactless interface).

Of course, the present invention is not limited to this numerical identifier example, and any other identifier, of different nature, may be used.

Figure 1:
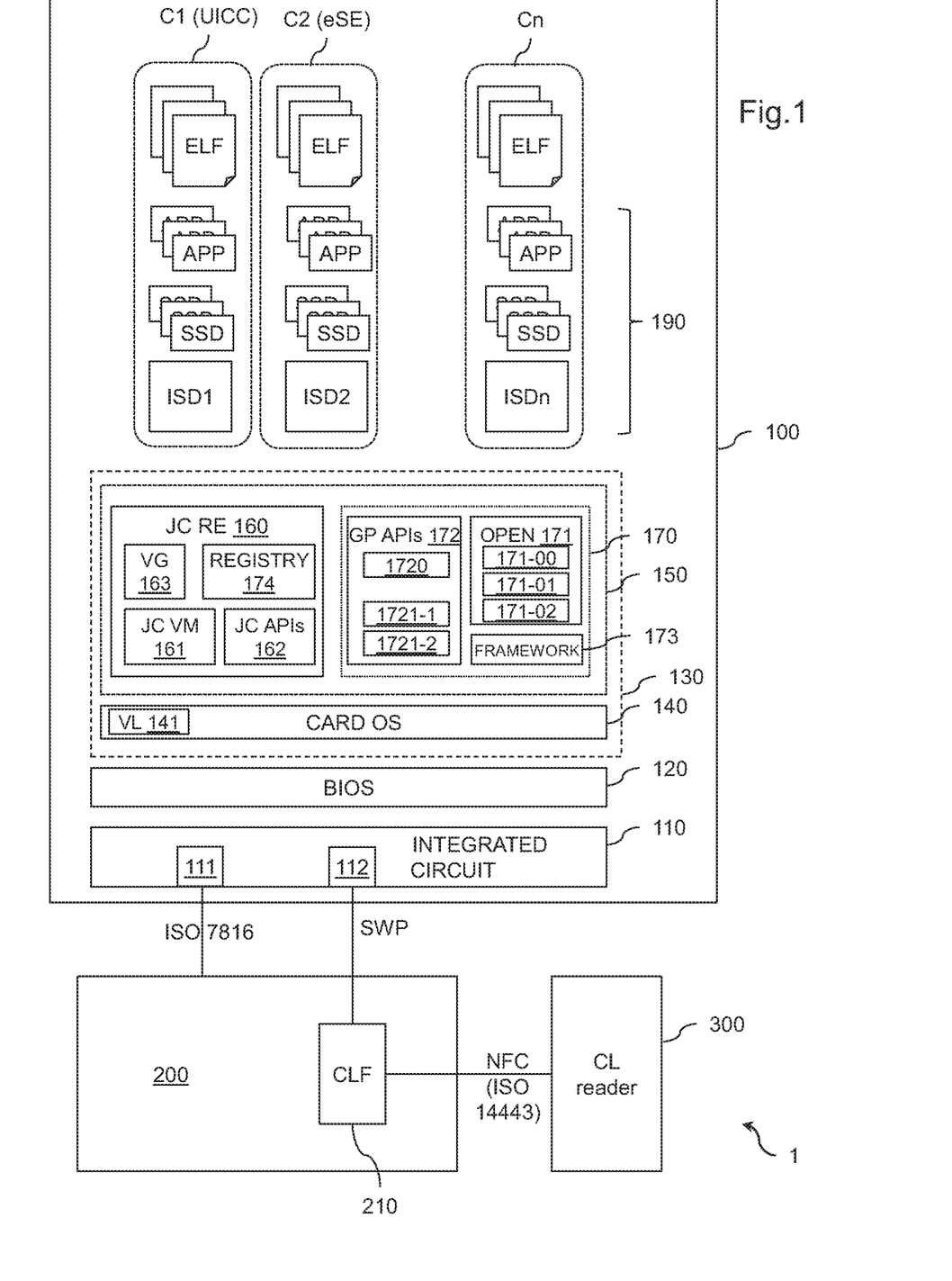
FIG. 1 illustrates, diagrammatically, a system comprising a secure element for implementing embodiments of the invention.

FIG. 1 illustrates, diagrammatically, a system 1 comprising a secure element 100 for the implementation of embodiments of the invention.

The secure element SE 100 is for example embedded in a host terminal 200, which is provided with a contactless communication module CLF (standing for "contact-less front-end") 210 for communicating with an external reader 300 CL. The host terminal 200 and the external reader 300 are of known types and are not therefore described in more detail.

In this example, the secure element 100 is formed by a hardware platform or integrated circuit 110, by a BIOS 120, and by a runtime environment 130 for executing applications or "applets" 190. These applications comprise several issuer security domains ISD1 to ISDn, within which other applications APP, SSD may be or have been instantiated based on elementary load files (ELFs). In the example taken in the course of the present document, a first ISD, referenced ISD1, is in accordance with the GlobalPlatform UICC configuration and a second ISD, referenced ISD2, is in accordance with the GlobalPlatform eSE configuration.

In a manner known per se, the hardware platform 110 comprises a microprocessor, memories (volatile and non-volatile) for the storage of computer programs and/or execution data, communication interfaces enabling data to be exchanged between the microprocessor and the outside of the SE 100 and possibly to electrically supply the SE, and a bus connecting these different components.

In the example of the Figure, the hardware platform 110 implements two communication interfaces 111, 112, one with ISO/IEC 7816 contact with the host terminal 200 and the other ISO/IEC 14443 or NFC (standing for "Near Field Communication") being contactless with the external reader 300. The contactless interface 112 is able to communicate with the external reader 300 via the CLF module 210 of the host terminal 200 in which case the SE 100-terminal 200 link is in accordance with the SWP (standing for "Single Wire Protocol") protocol, or may, as a variant, directly communicate with the external reader 300 without passing via the CLF module 210 of the host terminal 200.

This is just one example. A greater number of interfaces may in particular be implemented.

It is by these communication interfaces 111, 112 that the SE 100 receives commands from the outside (either from the host terminal 200, or from the reader 300).

The interface with contact 111 is conventionally used for exchanges between the host terminal 200 and mobile telephone applications contained in the UICC "world" managed by the ISD1, whereas the contactless interface 112 is conventionally used for exchanges between an external reader 300 and applications apart from mobile telephone applications contained in the eSE "world" managed by the ISD2.

The BIOS 120 provides the interfacing between the hardware layer 110 of the SE 100 and the native components of the SE such as the runtime environment 130 described below. The BIOS 120 is conventional here.

The present invention provides a runtime environment 130 configured to determine a target application for executing a command received according to the communication interface for receiving the command and to authorize the access to an application resource of the secure element (for example an application 190 or a GlobalPlatform API 172) for executing the command by the target application solely if that application resource is associated with the communication interface for receiving the command.

On performing these operations, the execution of a received command is confined in a "world" of application resources which is defined for the communication interface in question, either the UICC "world" or the "eSE" world in the example taken here by way of illustration. By associating different configurations (or "worlds") with different communication interfaces, the SE 100 henceforth makes it possible to execute several different configurations independently. The coexistence of several configurations within a same secure element is thus possible.

The runtime environment 130 is formed by an operating system 140 OS, and by a high-level runtime environment 150, for example a runtime environment in accordance with the GlobalPlatform 2.3 standard.

The operating system 140 performs conventional operations of a secure element OS, including in particular receiving a command on a communication interface for communication with the outside of the secure element, sending it to the GlobalPlatform runtime environment 150 to obtain a response, then sending, over the same communication interface, that response thus obtained.

In a conventional manner, the commands supplied to the GlobalPlatform runtime environment 150 are APDU commands.

The interaction between the operating system 140 and the GlobalPlatform runtime environment 150 is typically single thread, meaning that, until the execution of the previous command has finished, the operating system 140 does not send the GlobalPlatform runtime environment 150 new APDU commands that have been received.

In one embodiment with priority management, it may be slightly different, and this single thread rule may be circumvented for commands of high priority. For example, if a received command is detected by the OS 140 as having greater priority than a command in course of execution, the OS 140 is nevertheless able to decide to pass that new command to the GlobalPlatform runtime environment 150 for immediate execution. The execution of the current command is then suspended until the end of the execution of new command.

Conventionally, the SE 100 only possesses a single communication interface for communication with the outside. Thus, for a current command, the operating system 140 has constant knowledge of the communication interface for receiving the command that should be used to send the APDU response obtained in reply.

Under the invention in which several communication interfaces 111, 112 are provided, the OS 140 is able to store, in a local or global variable, an identifier IND of the communication interface on which the current command has been received (and thus the corresponding UICC or eSE "world"). For example, the variable takes the value 00 if the interface is with contact (thus for the UICC "world" and takes the value 01 if the interface is contactless (thus for the eSE "world"). Of course, other values may be employed, in particular with a greater number of concurrent interfaces.

This variable makes it possible to keep a trace of the interface to use to send the response that will be obtained.

Furthermore, in the case of the embodiment with priority management, this identifier stored in the variable may be copied into another variable (or more generally into a FILO list) at the time of the suspension of a current command (on account of the priority processing of another command). This copying makes it possible to preserve the trace of the interface for receiving the suspended command during the whole of the execution of the command of greater priority. Thus, at the end of the latter, the copied identifier may be put back into the local or global variable to enable the OS 140 to use the right communication interface when the response is to be sent to the previously suspended command.

The variable or variables used here to store the communication interfaces used may be local 141 to the OS 140 or be global variables 163 used by the GlobalPlatform runtime environment 150 (and more particularly the Java Card environment it contains).

In this last case, the OS 140 merely has to send the received APDU command to the GlobalPlatform runtime environment 150, which can check the execution of that command as described below in order to confine it to the UICC or eSE "world" associated with the interface stated in the variable.

In the first case, the OS 140 sends the received APDU command accompanied by an indication of the receiving communication interface, typically the value IND (even if other indications are possible). This indication enables the GlobalPlatform runtime environment 150 to set a global variable 163 described below, to indicate therein the communication interface on which the current command was received. This again makes it possible to preserve the trace of the UICC or eSE "world" in which the execution of the current command is to be confined.

The GlobalPlatform runtime environment 150 comprises, in the example of the Figure, a multi-application runtime environment 160 and a set of GlobalPlatform libraries 170 for the secure management and execution of the applications 190.

The multi-application runtime environment 160 is typically a Java Card (tradename) runtime environment formed by a Java Card virtual machine (VM) 161 and a plurality of native APIs defined by the Java Card standard, here called Java Card APIs 162. Such a virtual machine supports logical channels, meaning that several applications can be selected simultaneously via distinct logical channels (identified inside APDU commands and responses).

The Java Card VM 161 receives the APDU commands from the OS 140 possibly accompanied by the indication of the communication interfaces for receiving those commands. In this case, the Java Card VM 161 updates the global variable 163 with the interface indication relative to the current command: "00" for the interface with contact (thus the UICC "world") and "01" for the contactless interface (thus the eSE "world").

In the embodiment with priority management, the Java Card VM 161 is also able to declare other global variables (or more generally a FILO queue) to store the interface indications relative to one or more suspended commands of lower priority (and of which the execution is resumed later).

The Java Card runtime environment 160 is loaded, in compiled form, into the SE 100 at the time of its pre-personalization. This environment is not due to be modified during the life of the SE.

However, for security reasons, it may prove useful for the access to certain Java Card APIs 162 to be limited to certain "worlds" (or ISDs) and thus prohibited to others. In this case, these APIs 162 may be marked as belonging to some particular "world" as of their compilation, in a format that can be recognized by the Java Card VM 161 to prohibit the access thereto if required.

For example, a Java Card API may be dedicated to the NFC contactless communication interface 112 (and thus to the eSE "world"), in which case it is preferable for it not to be accessible to the mobile telephone applications of the UICC "world". The identifier of such an API 162 solely accessible to an application that is not a mobile telephone application (eSE "world") may then be completed (prefix or suffix) with the indicator IND="01".

In similar manner, a Java Card API of ETSI Toolkit type is used only by mobile telephone applications (thus the UICC "world"), and should not be accessible to the applications of the eSE "world". The identifier of an API 162 solely accessible to a mobile telephone application (UICC "world") may then be completed with the indicator IND="00".

Lastly, some APIs accessible by all the "worlds" may be marked using the identifier in common IND="02" or possibly not be marked at all. Group identifiers may also be use to mark APIs as accessible by a subset (or group) of configurations installed in the SE.

Of course, other values and a greater number of interface may be taken into account.

The set of GlobalPlatform libraries 170 defined by the GlobalPlatform (GP) standard comprises a GP environment known by the name OPEN 171, GP APIs 172, and a trusted framework 173.

In known manner, the OPEN 171 provides functions for selecting applications 190 (including security domains) processing received SELECT commands, for distributing APDU commands received by the Java Card VM 161 to target applications, for providing security for commands and responses (corresponding to the concept, well-known to the person skilled in the art, of secure channels, for managing logical channels at the time of selecting multiple applications, for managing the content of the SE (for example checking, loading, installation, deletion of content such as ELF files and applications) or for instance for managing SE security (to change the life cycle states of the security domains, including the issuer security domains).

For the management of the content of the SE 100, including the security domains, the OPEN 171 keeps up-to-date a register 174 (stored for example by the Java Card VM 161) which lists the packages (or ELF files) loaded into memory, typically packages of applications 190 or packages of GP APIs 172, as well as the applications 190 instantiated on the basis of those packages. These packages, applications and APIs are grouped together under the term application resources.

The register 174 is for example a list of AIDs identifying these application resources and it links each of them to the security domain to which it belongs (either the ISD or an domain referred to as supplementary domain (SSD)).

In one embodiment of the invention making it possible to control access or even the execution of application resources in a particular configuration (for example UICC or eSE "world"), the register 174 associates, with the application identifier (AID) specific to a package, an API or application, the indicator IND representing the "world" concerned: IND="00" for an application resource dedicated to the UICC "world" (interface with contact) "01" for the eSE "world" (contactless interface) or "02" for an application resource common to both "worlds".

Thus, on loading packages and installing applications 190 managed by the OPEN 171, the latter creates a new entry in the register 174 based on the AID for those application resources, associating with it, for the needs of the invention, the indicator representing the interface for receiving commands for loading/installation (indicator entered in the global variable 163 at the time of the loading/installation). In a manner known per se, a new entry is created in the register for each executable module or "package" present in a loaded ELF elementary file (these executable modules thus including the APIs) and for each application installed (and thus instantiated) on the basis of those modules.

It is on the basis of this register, and more particularly of this indicator that, as described below, the Java Card VM 161 is able to conduct an operation of checking and confinement of the execution of a command by a target application in the UICC or eSE configuration corresponding to the interface 111 or 112 used (as indicated in the global variable 163).

The register 174 is also able to store a life cycle state of the security domains as defined in the GlobalPlatform standard. In particular, in the context of the invention, the register 174 may thus be caused to store the life cycle state of two (or more) ISDs (and thus different configurations or "worlds") during the life of the SE 100. The checking of these life cycle states of the ISDs is under the responsibility of the OPEN 171, which acts in response to commands for management of the SE received from the owner of the corresponding configuration.

It is thus noted that the SE according to the invention makes it possible to independently manage the life cycle state of the different configurations it hosts. For example, if it is desired to block NFC communications (of the "eSE" world), it is possible to pass from the life cycle state of the ISD2 "eSE" to CARD_LOCKED according to GlobalPlatform (for temporary blocking) or even to TERMINATED (for definitive blocking). As for the ISD1, at the same time it is able to remain functional in the SECURED life cycle state. Similarly, if it is wished to block mobile telephone functions, the life cycle state of the "UICC" ISD1 may be set to CARD_LOCKED or TERMINATED.

Figure 2:
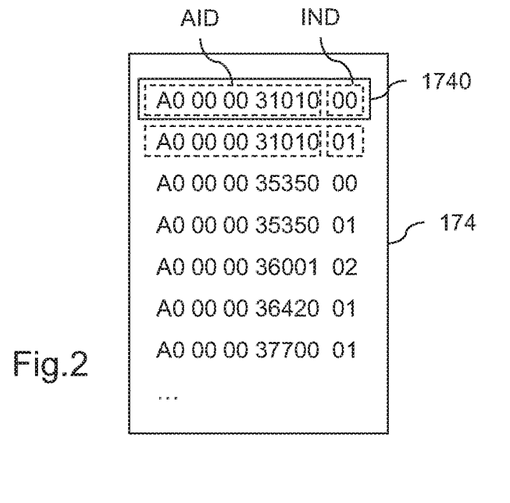
FIGS. 2 and 2a illustrate examples of a GlobalPlatform register for implementing embodiments of the invention.

FIG. 2 illustrates an example of a register 174 with a few entries. One entry corresponds to an application resource, for example an executable module (GP library or GP API 172 for example) in an ELF, an instantiated application 190.

In this example, two applications have the same AID identifier "A0000031010" but are instantiated in both distinct configurations UICC and eSE: the first in the UICC "world" since the register 174 associates the indicator IND "00" with the AID of the application (first line), the second in the eSE world since the indicator IND used is "01" (second line).

Similarly, the application resource with the AID "A0000036001" is accessible to both "worlds", its indicator IND being common to both "worlds" via its value "02".

It is to be noted that the identifier 1740 resulting from the concatenation of the AID and the indicator IND is in the end unique in the SE 100. The identification of the application resources by unique identifiers is thus in accordance with the GlobalPlatform standard.

Figure 2A:
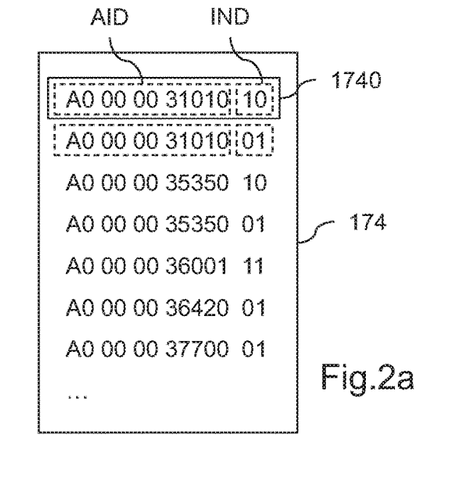

FIG. 2a illustrates a variant register 174 in which the indicator IND is composed of two bits (or values or Booleans), each bit indicating what interface the application resource considered is associated with. For example the first bit indicates that if the "world" associated with the interface with contact (thus in the example the UICC "world") is associated with the application resource, the second bit then indicates whether the "world" associated with the contactless interface is associated with the application resource. An indicator "11" thus indicates that the application resource is common to both the UICC and eSE "worlds".

Of course, the number of bits may be adapted to the number of "worlds" or configurations implemented simultaneously in the SE 100.

Returning to FIG. 1, the OPEN 171 comprises a part 171-02 in common to the different "worlds" implemented in the SE 100. This is mainly the functions introduced above (allocation of the commands, application selection, content management, etc.).

The OPEN 171 however supplies services specific to certain "worlds". For example, the OPEN 171 provides encryption services for OTA channels, for example according to the SCP80 protocol, which is only used by mobile telephone applications (i.e. the UICC "world"). On the contrary, certain services are specific to the management of the NFC contactless communication interface, for example to define behaviors by default (i.e. the eSE "world").

In this way, the OPEN 171 comprises services dedicated to specific worlds, for example services 171-00 dedicated to the UICC "world" (for the interface with contact) and services 171-01 dedicated to the eSE "world" (for the contactless interface). The OPEN 171 is thus configured to authorize or not authorize, on processing a received command, the access to the services thereof according to the interface indicated in the global variable 163: for example if the latter indicates the contactless interface 112 (via the value "01"), then only the services 171-01 and 171-02 can be called for processing the current command.

The GP APIs 172 form a set of services or libraries used by the applications 190 for communicating with the outside in standardized manner. These are for example those services that enable decryption of the APDU commands received or encryption of the data in response. For example, the service in charge of providing security for commands is SecureChannel.

The GP APIs 172 are thus application resources called by the applications 190 executing a command. Thus, these APIs are provided to be specific to a particular configuration (or ISD).

The GlobalPlatform standard defines for example two packages of GP APIs, one being general (org.globalpatform), the other being specific to the contactless domain (org.globalpatform.contacless). Each configuration has its own GP API package at its disposal.

The GlobalPlatform service package "org.globalplatform.contactless" which is accessible by the applications of the eSE "world" (for the contactless interface) makes available a multitude of services, including in particular, by way of non-limiting example, access to a GlobalPlatform register dedicated to the contactless "world" (GPCLRegistry), an event framework enabling the applications to be notified of the apparition of events.

The GlobalPlatform service package "org.globalplatform" accessible by all applications provides other services, including in particular, by way of non-limiting example, the shared PIN service (PIN standing for "Personnal Identification Number") known by the designation "GlobalPIN" enabling particularly for example the verification of a PIN code entered by a user, the management of the number of possible attempts, the number of remaining attempts, etc.

Thus, in the example of the UICC and eSE "worlds", a general GP package of API 1720 is loaded into memory of the SE for the UICC "world" whereas two packages are loaded for the eSE "world", one 1721-1 being general and the other 1721-2 being contactless-specific.

This means for example that in the register 174 of FIG. 2, each loaded package is marked with the indicator IND of the corresponding UICC or eSE "world". For example, two general GP API packages of AID "A0000035350" are loaded, one for the UICC world "00", the other for the eSE world "01" (see lines 3 and 4), and the contactless package GP API of AID "A0000037700" is loaded solely for the eSE world "01" (see last line).

Access to these GP APIs is under the control of the Java Card VM 161 which, according to the value taken by the global variable 163, authorizes or does not authorize their execution in the context of the execution of a current command.

Lastly, the GP trusted framework 173 provides particularly for example secure services for communication between applications 190. Here too, the proper execution of these services is verified, as will be seen subsequently, by the Java Card VM 161 which, according to the invention, can only authorize an application to communicate solely with an application of its "world". Thus, here too, the Java Card VM 161 relies on the value taken by the global variable 163 to authorize or not authorize a communication between two applications.

The runtime environment 130 thus described enables the independent implementation of two (or more) GlobalPlatform configurations loaded into the SE 100 in a pre-personalization phase thereof.

A first configuration C1, for example the GlobalPlatform UICC configuration, is implemented in the SE 100, instantiating a first issuer security domain ISD1. This is a security management application which has high privileges (compared to the other applications 190) particularly for example in order to access the OPEN 171. This configuration C1 (and thus the ISD1) is associated with the ISO interface 111 with contact. In the example adopted again above, this UICC "world" is identified using the value IND="00" in the global variable 163 and the register 174.

A second configuration C2, for example the eSE configuration of GlobalPlatform, is implemented in the SE 100, instantiating a second issuer security domain ISD2, also having high privileges for accessing the OPEN 171. This configuration C2 (and thus the ISD2) is associated with the contactless ISO interface 112. In the example adopted again above, this eSE "world" is identified using the value IND="01" in the global variable 163 and the register 174.

The Figure shows a supplementary configuration Cn by way of example, which may be associated with another communication interface.

The mechanisms for managing these ISDs and their content remain conventional. In particular for example, the loading of the ELF elementary files, the installation of APP applications and the instantiation of supplementary security domains SSD are made possible by the set of management commands. These mechanisms are however under the control of the OPEN 171 as described above which, for its part, takes into account the communication interface used (indicated in the global variable 163) to tag the ISD1 or the ISD2 (or ISDn) and to keep up-to-date the register 174 according to the "world" concerned by a management command.

Figure 3:
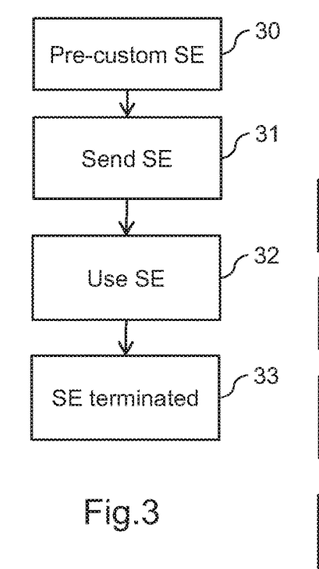
FIG. 3 illustrates, using a computer flowchart, a general cycle for a secure element according to one embodiment.
Figure 4:
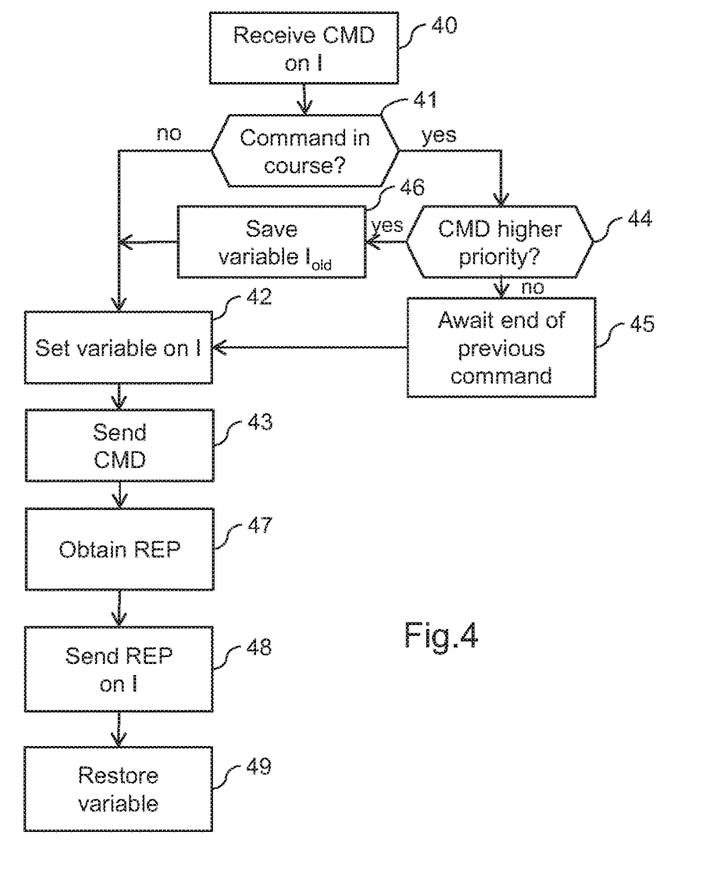
FIG. 4 illustrates, using a computer flowchart, general steps carried out by an operating system present in a secure element according to embodiments of the invention.
Figure 5A:
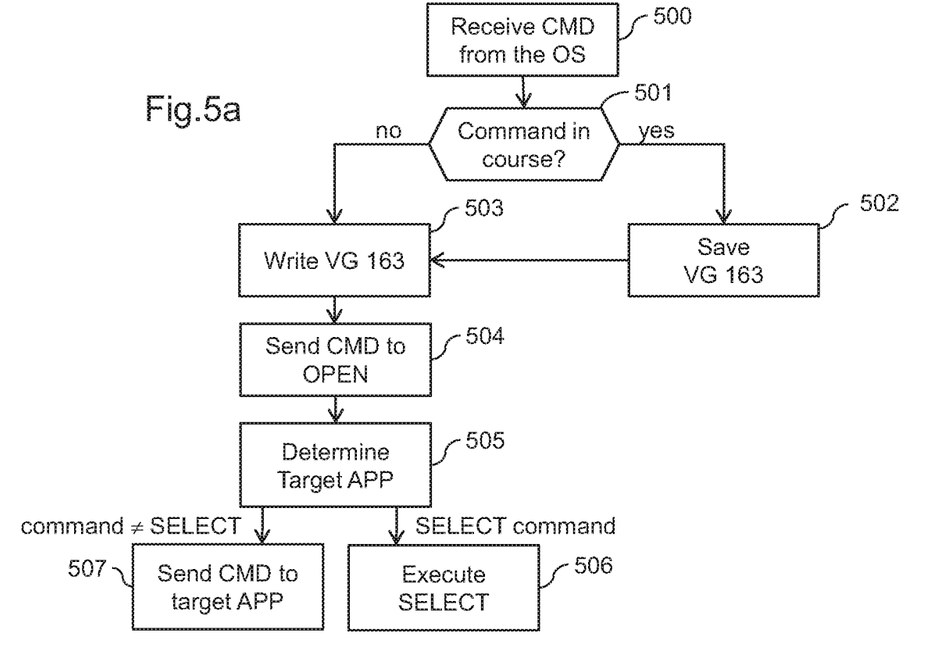
FIGS. 5a to 5c illustrate, using computer flowcharts, general steps carried out by a GlobalPlatform operation environment according to embodiments of the invention, respectively on receiving an APDU command, on receiving an APDU response and on receiving a request for access to an application resource when executing a current APDU command.
Figure 5B:
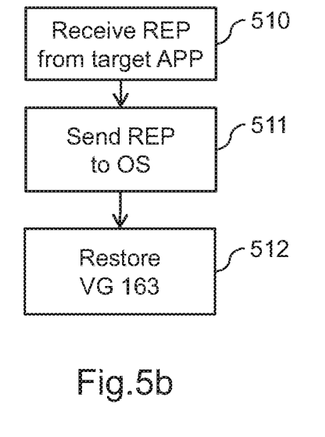
Figure 5C:
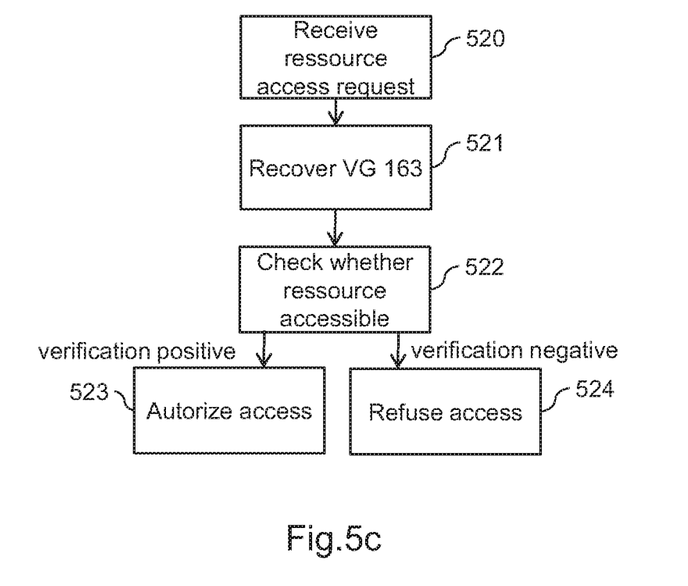

FIG. 3 illustrates the general cycle of an SE 100. FIG. 4 illustrates, using a computer flowchart, general steps carried out by the OS 140 according to embodiments of the invention. FIGS. 5a to 5c illustrate, using computer flowcharts, general steps carried out by the operation environment GP 150 according to embodiments of the invention, respectively on receiving an APDU command, on receiving an APDU response and on receiving a request for access to an application resource on execution of a current APDU command.

With reference to FIG. 3, the manufacture of the SE 100 before issuance to a final user comprises a pre-personalization operation 30 during which the native functions of the SE are loaded into memory of the SE 100. This operation is generally carried out via the ISO interface 111 of the SE 100.

In particular for example, the OS 140 described above is compiled then loaded into memory of the SE 100. This OS 140 is able to perform the operations described with reference to FIG. 4.

Also, the Java Card VM 161 and the native Java Card APIs 162 are loaded into memory of the SE 100. The Java Card VM 161 contributes to the operations described with reference to the FIG. 5, particularly for example to control the execution of the current command by authorizing or not authorizing the access to application resources according to the value contained in the global variable 163 (for example according to the UICC or eSE "world" considered, that is to say according to the communication interface 111 or 112 for receiving the command).

The Java Card VM 161 and the native Java Card APIs 162 are compiled before loading. In particular, the native Java Card APIs 162 are marked, at the time of their compilation, as being visible from one, another or several "worlds" (UICC C1 or eSE C2 in the example of FIG. 1) as described above. Thus, the access to the resources of Java Card API type for executing a current command may also be controlled by the Java Card VM 161 according to the current "world" (identified in the global variable 163).

The OPEN 171 and the trusted framework 173 are also loaded into memory of the SE 100.

Lastly, the ELFs of GP configurations UICC C1 and eSE C2 accompanied by the ELFs of the corresponding GP APIs (1720 for the UICC configuration C1 and 1721-1 and 1721-2 for the eSE configuration C2) are loaded into memory of the SE 100. Next, the issuer security domains ISD1 and ISD2 and possibly other applications 190 provided are instantiated on the basis of the loaded ELFs.

As referred to above, these loading operations and instantiations are accompanied by the creation of corresponding entries in the GP register 174 with marking of the "world" of belonging: one entry per executable module (for example a GP library/API 172) and one entry per instantiated application 190 (including the ISDs).

If the OPEN 171 automatically creates these entries at the time of those operations, the indicator IND (see FIGS. 2 and 2*a*) is set to a value representing the interface 111 with contact, since this is the one used for the commands for loading the ELF and installation files for the applications. All the entries are thus initially marked by the indicator IND="00". In this case, a proprietary command may make it possible to force the indicator IND to another value ("01" in the example) for the resources (executable module, application) corresponding to the eSE "world" (for the contactless interface), or even to a value in common ("02" in the example) for the shared resources.

Once the SE 100 has been pre-personalized in which each executable module or application is marked as belonging to one "world" (or several), the SE 100 is issued at step 31, for example embedded in a host terminal 200. For this operation, the life cycle state or states of the ISDs installed on the SE 100 are passed to the "SECURED" status as defined by the GlobalPlatform standard. This operation is carried out either by the sending of an ad hoc command to the OPEN 171, or by the sending of proprietary commands directly modifying the life cycle state of the ISDs in the register 174.

In one embodiment, each of the ISDs (and thus each "world" or configuration) has its own life cycle state. As a matter of fact, each ISD corresponds to an independent distinct configuration which, to an external observer, is like a distinct secure element. The invention then makes it possible to manage different life cycles for these apparent different secure elements.

However, as a variant, a single life cycle state may be employed for all (or as a variant for a sub-group) of the ISDs of the SE 100, for example for the ISD1.

After issuance, the SE 100 may be used (step 32) in the host terminal 200. The steps of FIGS. 4 and 5 described below concern operations carried out by the SE 100 during its use.

The ISDs forming the SE 100 can be progressively put into a "TERMINATED" life cycle state during its use. When all the ISDs have been marked as terminated, the SE 100 is no longer usable (step 33).

At step 32, the SE 100 is generally used as slave in a master-slave relationship with a resident application equipping the host terminal 200 or the contactless reader 300 (or more generally any external device). In other words, the SE 100 receives commands, typically APDUs, from the resident application and replies thereto with corresponding responses, typically APDUs.

With reference to FIG. 4, the OS 140 thus receives, at step 40, an APDU command CMD over a communication interface I, for example the contactless interface 112 to act on an application 190 of the eSE configuration C2.

As the OS 140 is single thread, it determines at step 41 whether there is already a command in course of execution by the GP runtime environment 150.

In the negative, the OS 140 sets the local variable 141 or the global variable 163 (according to the embodiment) to an IND value representing the interface I for receiving the command. In the example, the variable takes the value "01" since the interface I is the contactless interface 112. This is step 42.

Further to step 42, the OS 140 sends the received command CMD to the GP runtime environment 150 for execution. This is step 43.

Preferably, the command is accompanied by the IND indication representing the interface I, for example "01" in the example. This indication enables the Java Card VM 161 to set the global variable 163 to the correct value to confine the execution of the command CMD to the right "world", that is to say the "world" (or configuration) associated with the communication interface by which the command CMD was received. This "world" (or configuration) is also called current or active "world" (or configuration) below.

In the presence of a command already in course of execution (output "yes" from test 41), the OS 140 determines, at step 44, whether the command CMD received has greater priority than that in course of execution. This determination may furthermore verify whether the priority of the received command CMD is greater than a threshold priority for triggering a prioritization procedure (it being possible for the threshold priority to be defined in absolute terms—that is to say at a fixed priority value—or relatively to the command in course of execution—for example N priority levels above the command in course).

Step 44 is optional in that it is possible for the OS 140 not to implement the prioritization mechanism for the commands (in this case step 44 is not carried out).

In the negative (the command CMD does not have higher priority), the OS 140 awaits the end of the command in course of execution (and possibly other commands already received and suspended for the time being, which possibly have higher priority) at step 45 before passing to step 42 directed to configuring the OS 140 in the "world" corresponding to the command CMD before sending the latter for execution (step 43).

For example, the OS 140 may constitute a queue for the commands received and not yet processed. This queue may be of FIFO type (FIFO standing for "First In, First Out"). In one embodiment, a priority level of the commands received may be taken into account to put the commands waiting in the queue into order of priority (that with highest priority coming out first).

In the affirmative (command CMD of higher priority), the OS 140 decides to give priority to the new command CMD received, over that in course of execution. For this, the OS 140 saves the state of the local variable 141 or global variable 163 (according to the case) for the command in course of execution. The value of the variable may for example be stored in a FILO queue (first in, last out), which enables several higher priority commands to be recursively nested. This is step 46 before passing to step 42 described earlier to configure the OS 140 in the "world" corresponding to the command CMD before sending the latter for execution (step 43).

The execution of the command CMD sent to the GP runtime environment 150 leads, for the OS 140, to receiving, at step 47, an APDU response REP from the GP runtime environment 150 (generally from the Java Card VM 161).

At step 48, the OS 140 uses the value stored in the variable (local 141 or global 163) to know the interface I over which to send the response REP intended for the resident application.

If the prioritization mechanism has been put in place (i.e. when the FILO queue is not empty), step 48 is followed by step 49 during which the OS 140 restores the local variable 141 or global variable 163 for the lastly suspended command. This is a matter of setting that variable to the first value of the FILO queue.

Referring now to FIGS. 5a to 5c, the GP exploitation environment 150 receives three types of messages which lead to different processing operations in connection with the present invention: one being a command CMD sent by the OS 140, another being an APDU response resulting from the execution of the command CMD, and another being a request for access to an application resource on executing the current command CMD (sometimes several requests are received on executing the same command CMD).

At step 500, the Java Card VM 161 receives the command CMD from the OS 140, possibly accompanied by the IND indication representing the interface I for receiving the command.

At step 501, the Java Card VM 161 determines whether there is still a command in course of execution in which case the command prioritization mechanism is implemented.

In the affirmative, the Java Card VM 161 saves (step 502) the value of the global variable 163, for example in a FILO queue (as described in connection with step 46 above).

In the negative or further to step 502, the Java Card VM 161 proceeds to the optional step 503 (if the OS 140 has not updated the global variable 163) in which it sets the global variable 163 to the value IND accompanying the command CMD, i.e. the value "01" in the example (eSE "world" or configuration using the contactless interface).

The continuation of the processing operations (FIGS. 5a to 5c) is then carried out while only one "world" (or configuration) is "active" or "current", as henceforth indicated in the global variable 163.

The command CMD is passed to OPEN 171 at step 504 to determine (step 505) the target application to execute that command.

In known manner, the commands of SELECT type are executed by the OPEN 171 itself in a process for selecting an application. The other commands are executed by one of the applications 190 that the OPEN 171 identifies by virtue of the logical channel indicated in the command CMD.

If this is a SELECT command indicating a logical channel from among the 20 available logical channels in the APDU format, the OPEN 171 executes it at step 506. The execution consists for the OPEN 171 in determining whether the AID indicated in the SELECT command corresponds to an entry of the register 174 and whether that entry (and thus application) is selectable.

Given the plurality of configurations (or "worlds") in the SE 100 according to the invention, the OPEN 171 furthermore takes into account the active "world", that is to say the current IND value stored in the global variable 163. For example, the OPEN 171 is able to concatenate the AID indicated in the command with the current IND value ("01" in the example) to constitute a unique identifier for entry in the register 174 (see FIG. 2 for example). Thus, if an entry in the register 174 corresponds to that unique identifier and is selectable, the OPEN 171 selects it by allocating to it the logical channel indicated in the SELECT command.

In other words, the OPEN 171 accesses the register 174 associating, with each of a plurality of application resources, an application identifier (AID) specific to the application resource and an indicator representing an associated communication interface, and selects, on receiving the command for selecting an application identified by an identifier AID and received over the communication interface I, the application which, in the register, is associated with the identifier AID and with the communication interface for receiving.

If it is a command other than the SELECT command, determining the target application at step 505 consists of identifying the logical channel indicated in the command CMD for the active "world" as indicated in the global variable 163. As a matter of fact, although twenty logical channels are available in the APDU command format, they are duplicated in the different available configurations (two or even more) in the SE 100. This situation according to the invention results from the matching/association "world"—interface (one world per interface) and from the fact that there is duplication of the logical channels per interface. Thus, the OPEN 171 must uniquely choose the logical channel in connection with the active "world" (i.e. associated with the communication interface used for receiving the command CMD).

The target application is thus the application selected for the logical channel so determined in the active "world".

In this way, the OPEN 171 determines the target application according to the communication interface I for receiving the command CMD.

The OPEN 171 then sends the command CMD to the target application via the logical channel determined. This is step 507.

The execution of the command CMD, whether or not it is of SELECT type, leads to the generation of a response REP. At step 510, the Java Card VM 161 therefore receives, from the target application that executed the command CMD, a response REP.

The Java Card VM 161 then sends this response REP to the OS 140 at the step 511.

Next, at step 512, the Java Card VM 161 restores the first value of the FILO list in the global variable 163 (in similar manner to step 49 described above). Step 512 enables the GP runtime environment 150 to update the indication representing the current "world" for the suspended command or commands of which the execution will resume further to the processing of the command CMD.

The execution of the command CMD (typically a command other than SELECT) sometimes requires access to resources that are external to the target application, for example access to other applications 190, access to GP or Java Card APIs, 172 or 162.

This is the case for Card Content Management commands of the SE processed by the ISD of the active configuration. For example, the installation of a new package (new ELF) may be carried out with reference to other ELF files already loaded into the SE 100, which should be copied.

This is also the case for commands intended for applications installed in the ISDs and of which the execution requires services of other applications (sharing mechanism).

These various commands may also require access to APIs for protocol needs (SWP protocol via a Java Card) API), cryptography needs (SCP80 protocol via a GP API), etc.

According to the invention, access to such application resources by the SE 100 for executing the command CMD by the target application is authorized only if those application resources are accessible for the active configuration, i.e. if they are associated with the communication interface I for receiving the command as indicated in the global variable 163. Upon each of the requests for access to such resources, the Java Card VM 161 thus performs access control. This control may typically be carried out by a Java Card firewall within the Java Card VM 161. As already seen earlier, the conventional functionalities of the firewall are thus extended, by the present invention, with this new role of access control.

Such control is for example also made by the OPEN 171 when accessing its own services 171-00 to 171-02.

Thus, at step 520 which takes place during the execution of the command CMD (i.e. between steps 504 and 510), the Java Card VM 161 detects a request for access to an application resource. This request comes from the execution of the command CMD by the target application in the Java Card runtime environment 160 (JCRE standing for Java Card Runtime Environment).

This requested application resource corresponds, in the register 174, to an AID completed with the indicator IND.

At step 521, the Java Card VM 161 retrieves the value of the global variable 163, indicating the active configuration, i.e. the configuration eSE in the example (IND="01").

At step 522, the Java Card VM 161 checks that the requested application resource is accessible in the active configuration, here the eSE configuration. It may for example check that the indicator IND of the requested resource corresponds to the value taken by the global variable 163, or that it is a value in common encompassing the interface indicated by the global variable 163.

For example, if the global variable 163 is set to 01 (contactless interface), resources having an indicator IND at "01" or "or "02" (in the case of FIG. 2) are accessible (or "01" or "11" in the case of FIG. 2a).

In the affirmative, the execution of the command CMD can continue by authorizing the access to the requested resource (step 523).

In the negative, the Java Card VM 161 refuses access to the requested resource (step 524). This refusal may lead to a failure in the execution of the command CMD if the target application executing it does not know how to manage that refusal. In the opposite case (the target application manages the refusal), the execution of the command CMD can continue.

Several requests for access to other resources may be issued during the execution of the same command CMD.

The preceding examples are only embodiments of the invention which is not limited thereto.

The invention claimed is:

1. A secure element comprising: a plurality of applications; a runtime environment for executing the applications; a plurality of communication interfaces for communication with an outside of the secure element; and a plurality of application resources; each of the application resources being respectively associated with at least one of the communication interfaces; the runtime environment being configured to receive a command on a communication interface, among the plurality of communication interfaces to determine a target application for executing the command and for sending, over the communication interface on which the command has been received, a response to the command received from the target application, wherein the runtime environment is configured to determine the target application according to the communication interface on which the command has been received, and to authorize access to the application resource of the secure element for the execution of the command by the target application solely if said application resource is associated with the communication interface on which the command has been received.

2. The secure element according to claim 1, comprising at least two security management applications defining two issuer security domains, each issuer security domain being associated with a different communication interface.

3. The secure element according to claim 2, wherein a first issuer security domain is associated with a communication interface with contact, and a second issuer security domain is associated with a contactless communication interface.

4. The secure element according to claim 3, wherein the communication interface with contact is of ISO/IEC 7816 type.

5. The secure element according to claim 3, wherein the contactless communication interface is of ISO/IEC 14443 type.

6. The secure element according to claim 2, wherein the runtime environment is configured to manage a life cycle state register for each of the two issuer security domains.

7. The secure element according to claim 2, wherein an issuer security domain and associated application resources are in accordance with the embedded Security Element (eSE) configuration of the GlobalPlatform 2.3 standard and/or an issuer security domain and associated application resources are in accordance with the Universal Integrated Circuit Card (UICC) configuration of the GlobalPlatform 2.3 standard.

8. The secure element according to claim 1, wherein the runtime environment comprises a register which associates, with each of a plurality of application resources, an application identifier specific to the application resource and an indicator representing an associated communication interface.

9. The secure element according to claim 8, wherein the register comprises at least one application resource associated with an indicator common to several communication interfaces.

10. The secure element according to claim 1, wherein the runtime environment comprises a global variable set to a value representing the communication interface for receiving the command.

11. The secure element according to claim 1, wherein the runtime environment comprises a runtime environment in accordance with the GlobalPlatform 2.3 standard and an operating system interfacing the runtime environment in accordance with GlobalPlatform 2.3 with a hardware platform of the secure element.

12. The secure element according to claim 11, wherein the operating system is configured to send, to the runtime environment in accordance with the GlobalPlatform 2.3 standard, any command received on a communication interface, accompanied by an indication of the receiving communication interface.

13. The secure element according to claim 11, wherein the operating system comprises a local variable set to a value representing the communication interface for receiving the command.

14. The secure element according to claim 11, wherein the runtime environment in accordance with the GlobalPlatform 2.3 standard comprises a Java Card runtime environment formed by a Java Card virtual machine and Java Card application programming interfaces, said Java Card virtual machine being configured to check that any application resource used for executing the command by the target application is associated with the communication interface for receiving the command.

15. The secure element according to claim 14, wherein the Java Card virtual machine is configured, on receiving a command accompanied by an indication of a receiving communication interface, to set a global variable to a value representing the indicated receiving communication interface.

16. The secure element according to claim 14, wherein a Java Card application programming interface (API) is natively associated with one specific communication interface, such that this Java Card API is only used for executing a command by a target application associated with the specific communication interface.

17. The secure element according to claim 11, wherein the runtime environment in accordance with the GlobalPlatform 2.3 standard comprises a system programming interface (OPEN) in GlobalPlatform 2.3 that is configured to determine the target application according to the communication interface for receiving the command.

18. The secure element according to claim 17, wherein the OPEN is configured for:
   accessing a register which associates, with each of a plurality of application resources, an application identifier (AID) specific to the application resource and an indicator representing an associated communication interface, and
   on receiving a command for selecting an application identified by an AID identifier included in the command received over a communication interface, selecting the application which, in the register, is associated with the AID identifier and with the receiving communication interface.

19. The secure element according to claim 1, wherein the runtime environment is configured for, on reception, over a second communication interface, of a second command of greater priority than the command in course of execution by the target application:
   suspending the execution of the command by the target application and storing an indication representing the communication interface for receiving the suspended command, then
   determining a second target application for executing the second command according to the second communication interface and checking that any application resource accessed on execution of the second command by the second target application is associated with the second communication interface.

20. A processing method in a secure element comprising: a plurality of communication interfaces for communication with the outside of the secure element; a plurality of applications; a plurality of application resources, and a runtime environment for executing the applications; each of the application resources being respectively associated with at least one of the communication interfaces, the method comprising: receiving a command on a communication interface among the plurality of communication interfaces; determining a target application for executing the command according to the communication interface on which the command has been received; authorizing the access to the application resource of the secure element for executing the command by the target application solely if that application resource is associated with the communication interface, on which the command has been received; and sending, over the communication interface on which the command has been received, a response to the command received from the target application.

* * * * *